United States Patent [19]

Weisbrich

[11] Patent Number: 4,540,333
[45] Date of Patent: Sep. 10, 1985

[54] TARP ROTOR SYSTEM THRUST, YAW AND LOAD CONTROL

[76] Inventor: Alfred L. Weisbrich, 3 Lenora Dr., West Simsbury, Conn. 06092

[21] Appl. No.: 344,604

[22] Filed: Feb. 1, 1982

Related U.S. Application Data

[63] Continuation-in-part of Ser. No. 273,006, Jun. 12, 1981, Pat. No. 4,332,518.

[51] Int. Cl.³ .............................................. F03D 1/02
[52] U.S. Cl. ......................................... 415/2 A; 415/4
[58] Field of Search .............................. 415/2 A, 4 A

[56] References Cited

U.S. PATENT DOCUMENTS

| | | |
|---|---|---|
| 4,021,140 | 5/1977 | Weisbrich ........................ 415/2 R X |
| 4,034,231 | 7/1977 | Conn et al. ....................... 417/330 X |
| 4,156,579 | 5/1979 | Weisbrich ............................ 415/2 A |
| 4,288,199 | 9/1981 | Weisbrich ............................ 415/2 R |
| 4,332,518 | 6/1982 | Weisbrich ............................ 415/2 A |

Primary Examiner—Everette A. Powell, Jr.

[57] ABSTRACT

Presented is a means for thrust and, hence, yaw and load control of a TARP twin rotor system by means of initiating a thrust differential between said rotors which, in turn, yaws the twin rotor assembly into a protected low flow velocity region about a TARP and alleviates load on said assembly.

7 Claims, 8 Drawing Figures

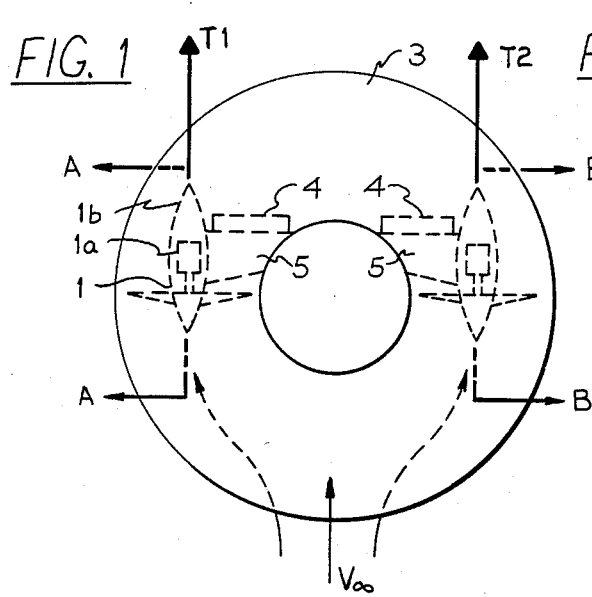
FIG. 1
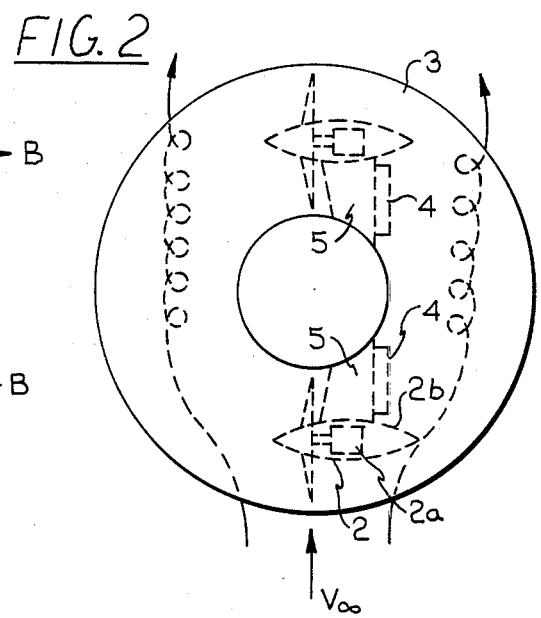
FIG. 2
FIG. 3a
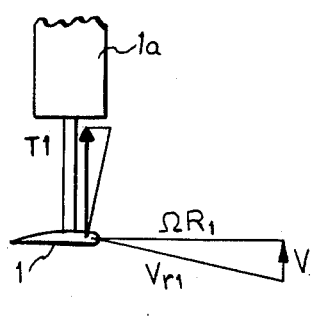
FIG. 3b
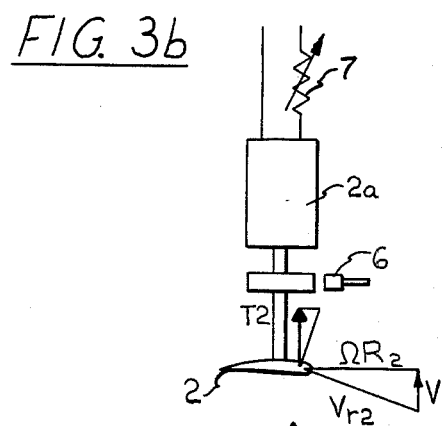
FIG. 4a
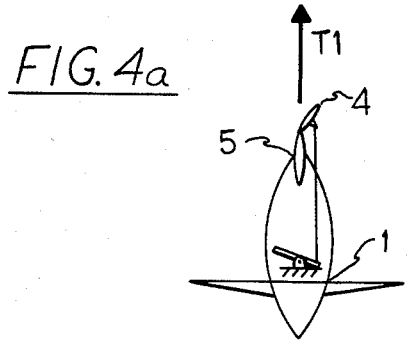
FIG. 4b
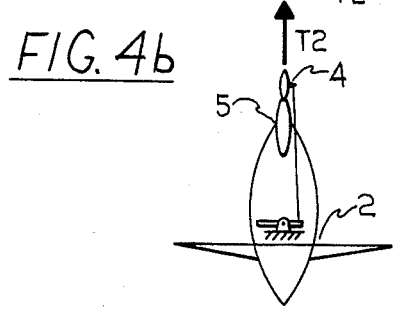
FIG. 5a
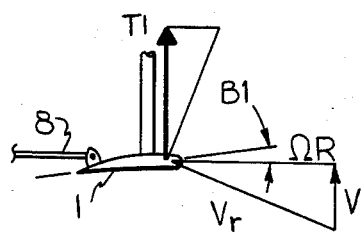
FIG. 5b
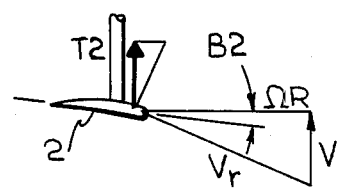

TARP ROTOR SYSTEM THRUST, YAW AND LOAD CONTROL

This application is a continuation-in-part application of the multi-functional Toroidal Accelerator Rotor Platform i.e., TARP rotor strut Vanes application, Ser. No. 06/273,006 filed 06/12/1981 now U.S. Pat. No. 4,332,518 dated June 1, 1982.

BACKGROUND OF THE INVENTION

When a fluid, having uncontrollable velocity, impinges upon a power extracting impeller, for example, a high wind impacting a wind turbine, excessive loads may have to be absorbed by the impeller and supporting structure unless means are available to spill excessive loads. In conventional wind energy conversion systems, such as horizontal axis turbines operating on a tower or such as vertical axis wind turbines, load control is achieved generally by means of complex rotor blade pitch change mechanisms and/or powered yaw drives to yaw the rotor disc plane approximately (parallel) to the wind and/or application of large capacity brakes to the rotor drive shaft assembly to stop the rotor rpm. Regardless of which of the previous means of load control is applied, the rotor blades are still exposed to the severe fluid or wind velocity and, although loads on these blades are reduced, these rotors must deal with substantial survival fluid velocities and resulting stressing. Furthermore, since cost of energy produced by energy conversion systems is dictated in part by system capital cost, requirements of complex, large capacity and thus costly control subsystems, as described previously, adversely impact cost of energy.

A simple cost effective means of rotor load control is presented whereby, for TARP mounted twin interconnected rotor-generator assemblies located in TARP high fluid velocity fields, via creating rotor assembly thrust force differential between substantially diametrically oppositely located rotor assemblies causes said rotor-generator assemblies to subsequently yaw out of the high fluid velocity fluid stream and into shielded stagnation or low velocity wake flow fields about the TARP body.

Rotor thrust force differential means is achieved by one of several optional means, including: rotor speed changes such as slowing the rpm of one rotor-generator assembly relative to the other via application of a small mechanical or electrical brake to the rotor drive shaft assembly, which, unlike for conventional wind turbines for example, need not have the capacity to stop the rotor rpm under high torque or power conditions; or application of an electrical load change to one rotor-generator assembly relative to the other rotor-generator assembly causing thereby the former rotor to slow in rpm and consequently experience a thrust difference with respect to the other rotor; or activation of a drag device on one rotor-generator assembly such drag device, for example, being a TARP rotor strut vane pitchable surface; or activation of rotor blade pitch angle change on one rotor relative to the other. The noted optional means of rotor-generator assembly thrust differential actuation means can range from simple and economic to complex and costly. However, in either event, the proposed invention rotor load control is greatly superior over conventional system load alleviation means.

The present invention providing the process and means of TARP rotor system thrust, yaw and hence, load control means is henceforth designated as a TARP rotor system thrust, yaw and load control; i.e., TY&L control.

SUMMARY OF THE INVENTION

In accordance with the present invention, together with the TARP, being a flow augmentor structure, providing for means that can function and serve as a rotor system thrust, yaw and load control means about the symmetrical TARP structure centroidal axis, by initiating thrust force differences between the twin TARP rotors by activating on one rotor-generator assembly either: a small brake on its drive train, or an electrical generator load change relative to the other, or a drag device such as a TARP rotor strut vane pitchable surface, or a change in rotor blade pitch relative to the other rotor.

BRIEF DESCRIPTION OF THE DRAWINGS

FIG. 1 is a plan view of a TARP illustrating rotor assemblies within high fluid velocity field experiencing relative thrust differential forces T1 to T2 due to TY&L control activation.

FIG. 2 is a plan view of a TARP showing rotors subsequently yawed and positioned out of high velocity TARP flow after thrust differential TY&L control application.

FIGS. 3(a)&(b) is a vectorial force representation of differential thrust force generation resulting from rotor speed change caused by TY&L control, being a mechanical or electrical brake, being applied on the drive train of one rotor assembly relative to that of the other rotor assembly while in TARP high fluid velocity fields.

FIGS. 4(a)&(b) depicts rotor thrust differential force control on the rotor assemblies via TY&L control, being a drag surface, activated on TARP rotor strut vane.

FIGS. 5(a)&(b) shows vectorially the effects of TY&L control, being a blade pitch change means, on rotor thrust.

DESCRIPTION

Referring to FIG. 1, interconnected rotatable fluid impact impeller assemblies 1 and 2 eg. rotor-generator assemblies, comprised of horizontal axis rotors each with electrical generators, 1a, 2a within each nacelle 1b, 2b in this illustration, and the rotor system TY&L control means and process invention for rotor system yaw activation and, hence load control, are embodied within the impeller assemblies in a TARP 3, and its application effect shown with relative rotor thrust force vectors T1 and T2 acting upon said rotor assemblies 1, 2 upon activation of said rotor assembly system thrust, yaw and fluid impact load, i.e., TY&L, control.

Referring to FIG. 2, TARP 3 rotor assemblies 1 and 2 are illustrated yawed out of high velocity fluid flow into low speed wake flow and stagnation flow regions in the TARP, respectively, subsequent to rotor system thrust, yaw and fluid impact load control activation.

Referring to FIGS. 3(a)&(b), the effects of TY&L control via rotor rotational rpm speed changes, as illustrated vectorially on a blade on rotor 1 and rotor 2, respectively, on thrust T1 and T2 are shown as controlled by an embodied TARP rotor system TY&L, being either a brake 6 applied to a rotor assembly drive shaft, or a differential electrical load 7 applied to one rotor-generator set over the the other. ΩR represents a rotor blade rpm, V is the local fluid velocity and Vr is the relative fluid velocity impacting a blade.

Referring to FIGS. 1 & 4(a)&(b), the effect of activating TY&L control, being a drag surface 4, as a pitchable flap on the strut vane 5 of one rotor-generator assembly, on controlling rotor-generator assemblies 1, 2 thrust differential T1 to T2 is shown.

Referring to FIGS. 5(a)&(b), the effect of TY&L control, being a rotor blade pitch change mechanism 8, acting on blades of one rotor relative to the blades of the other rotor, on controlling thrust differential forces T1 to T2 between rotor assemblies 1, 2 is shown by varying rotor blade pitch angle B1 relative to B2.

Many modifications, embodiments, and changes will be evident in specific manners of actuating thrust differences on the TARP rotor assemblies while still remaining within the scope and spirit of the invention.

What I claim is:

1. A power generating device comprising:
a fluid flow velocity augmentor structure means being substantially the shape of a concentric interior section of a hollow toroid of general arbitrary cross-section in both vertical and horizontal planes, meaning that in both a vertical and horizontal plane cross-sections may not be limited to circular arc and circular sections respectively, providing thereby open peripheral fluid flow channel means and providing augmented flow velocity regions about the exterior periphery of said fluid flow augmentor structure wherein a plurality of interconnected fluid impact impeller assemblies are mounted within said peripheral fluid flow channel;
fluid impact impeller yaw means about said toroid centroidal axis; wherein the improvement comprises fluid impact impeller system assembly thrust, yaw and fluid impact load—i.e., TY&L—control means being substantially a device establishing thrust force differences between substantially diametrically located TARP impact impeller assemblies causing said assemblies to yaw out of high velocity fluid streams and into shielded stagnation or low velocity wake flow fields about the TARP body.

2. A power generating device according to claim 1 wherein said impact impeller TY&L control is a brake which is applied onto one of the impeller drive assemblies.

3. A power generating device according to claim 1 wherein said impact impeller assemblies are comprised, in part, of electrical generators and wherein said impact impeller assembly TY&L control means is a differential electrical load which is applied onto one impeller assembly electrical generator relative to another about said toroid.

4. A power generating device according to claim 1 wherein said impact impeller assembly TY&L control means is a drag surface which is deployable on one impeller assembly relative to another about said toroid.

5. A power generating device according to claim 1 wherein said impact impeller assembly TY&L control means is an impeller pitch change means which is activated on one impeller assembly relative to another about said toroid.

6. A power generating device according to claim 1 wherein said impact impeller assemblies are substantially two horizontal axis rotors with electrical generators.

7. A power generating device according to claim 4 wherein the drag surface is an impact impeller assembly support strut vane pitchable surface and the impact impellers are substantially two horizontal axis rotors.

* * * * *